Patented Feb. 28, 1950

2,498,778

UNITED STATES PATENT OFFICE 2,498,778

COMPOSITION TO INCREASE THE ABSORPTION BY THE BODY OF HISTAMINE

Rudolph R. Widmann, Beverly Hills, Calif., assignor to Organic Chemicals, Inc., Pasadena, Calif., a corporation of California No Drawing. Application November 10, 1947, Serial No. 785,194

4 Claims. (Cl. 167—55)

This invention pertains to a new product and method for increasing the absorption of histamine, and therefore the intensity of its physiological action, by suppressing its inactivation by the enzyme histaminase.

The product or composition of matter which I have invented is a composition or combination of one of the oral or injectable therapeutic precursors of histamine in vivo with an anti-histaminease compound or its hydrochloride salt. Some of the therapeutic precursors of histamine in vivo are histidine and ascorbic acid; histidine and cysteine or a related sulfhydril compound; and histidine and pyridoxine, all these as such or in the form of their hydrochloride salts.

Histidine, pyridoxine and all of the oral therapeutic precursors of histamine in vivo can be administered orally or by injection, and the anti-histaminase compounds may be solid or liquid, depending on whether they are in the form of the straight compound or in the chloride salt form, and they are administered orally.

For the sake of brevity herein I will always refer hereinafter to histidine or its hydrochloride salt as "histidine"; to pyridoxine or its hydrochloride salt as "pyridoxine"; to cysteine or a related sulfhydril compound as "cysteine"; to a powder, pill or tablet as a "solid package."

Also by the term "pyridoxine" herein I will include each of the following descriptive words or phrases: Vitamin B-6 and its hydrochloride salt, also known as adermin, shown to be identical with the factor Y of Chick and Copping, the antidermatitis factor of Hogan and Richardson, the "vitamin H" of Booher, and the factor I of Lepkovsky, Jukes and Krause, closely related to codecarboxylase of bacterial amino-acid decarboxylases, and designated by The Council on Pharmacy and Chemistry of the American Medical Association as pyridoxine, a name first proposed by Gyorgy and Eckhardt in 1939 and having the following chemical structure and designation:

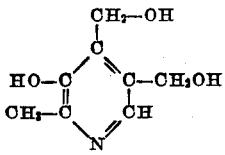

(2-methyl-3-hydroxy-4,5-di-(hydroxy-methyl)-pyridine)

ishings, meat, fish, whole wheat and corn and has been used at a catalyst of coenzyme activity for the enzyme histidine decarboxylase of Werle and Holz successfully.

Some of these anti-histaminase compounds are:

I. Ethylenediamines (to be known hereinafter as "ethylenediamine").

1. Ethylenediamine (anhydrous) also known as 1,2-diamino ethane and 1,2-ethanediamine, a colorless liquid with a molecular weight of 60.08 and having the following chemical formula:

$$NH_2CH_2CH_2NH_2$$

2. Ethylenediamine hydrate, a colorless liquid with a molecular weight of 78.09, and having the following chemical formula:

$$NH_2CH_2CH_2NH_2 \cdot H_2O$$

3. Ethylenediamine hydrochloride, also know as ethylene diammonium chloride, and consisting of white crystals with a molecular weight of 133.01, and having the following chemical formula:

$$HCl \cdot NH_2CH_2CH_2NH_2 \cdot HCl$$

II. Trimethylenediamines (to be known hereinafter as "trimethylenediamine").

1. Trimethylenediamine, also known as 1,3-diamino propane and 1,3-propanediamine, a colorless liquid with a molecular weight of 74.09, and having the following chemical formula:

$$NH_2(CH_2)_3NH_2$$

2. Trimethylenediamine hydrochloride having the following chemical formula:

$$HCl \cdot NH_2(CH_2)_3NH_2 \cdot HCl$$

III. Tetramethylenediamines (to be known hereinafter as "tetramethylenediamine").

1. Tetramethylenediamine, also known as 1,4-diamino butane 1,4-butanediamine, butylenediamine, and putrescin, and consisting of leaflets with a molecular weight of 88.11, and having the following chemical formula:

$$NH_2(CH_2)_4NH_2$$

2. Tetramethylenediamine hydrochloride consisting of light-colored crystals having the following chemical formula:

$$HCl \cdot NH_2(CH_2)_4NH_2 \cdot HCl$$

IV. Pentamethylenediamines (to be known hereinafter as "pentamethylenediamine").

1. Pentamethylenediamine also known as 1,5-diamino pentane, 1,5-pentanediamine, amylenediamine and cadaverine, a syrupy fumy liquid with a molecular weight of 102,13, and having the following chemical formula:

$$NH_2(CH_2)_5NH_2$$

2. Pentamethylenediamine hydrochloride having the following chemical formula:

$$HCl \cdot NH_2(CH_2)_5NH_2 \cdot HCl$$

Histaminase, a non-specific enzyme, believed to be a diamino-oxidase, and to contain a carbonyl group (C=O) in its chemical structure which at present is not completely known; known to be present in most tissues and in the human being, at least, chiefly in kidney and small intestine tissues, prevents and/or destroys the physiological action normally exerted by the amines of several of the natural or (1)-amino acids (to be referred to hereafter by the term amino acid). The exact mechanism of this action is unknown, though it is believed to take place through a single or multiple deaminating process of the amine of the corresponding amino acid. This enzyme, to be referred to hereafter as histaminase, is known to have a greater affinity for the more basic (alkaline) amines, that is the polyamines. The individual reactivity of any one of these polyamines, and specifically the diamine compounds with histaminase depends on: (1) the affinity of the compound for the enzyme; (2) the rapidity of its breakdown by the enzyme; and (3) the degree of optimum concentration of the substrate present for the formation of the substrate-enzyme complex needed for the reaction to occur. Of the diamines enumerated above the affinities of these compounds for histaminase decrease in an orderly manner from the two carbon chain compound, that is, ethylenediamine, through the four carbon chain compound, that is, tetramethylenediamine, and increase again with the five carbon chain compound or pentamethylenediamine. The rapidity of their breakdown by the enzyme histaminase increases in an orderly manner as the length of the carbon chain increases, and the degree of optimum substrate concentration needed for the reaction to occur is at best relatively broad. Histamine has a greater affinity for histaminase and the speed of its breakdown by histaminase is greater. However, the optimum substrate concentration needed for the formation of the substrate-enzyme complex, necessary for the reaction to occur, is a very specific one with a narrow range. Because of this specificity the administration of a diamine compound concomitant with the administration of histamine precursors produces as an end result a change in the optimum substrate concentration of the histamine which is formed, thus allowing the diamine to form a complex with the enzyme histaminase. This then blocks the destructive action of histaminase on the histamine formed and allows the latter to be absorbed by the body tissues in greater concentrations. Thus, the histamine formed by the interaction of histidine and pyridoxine or any other activating agent is able to exert a greater physiological effect on patients affected with vascular disorders.

Histaminase then is a strong inhibitor or blocking agent of the amine, histamine chemically designated as beta-iminazolyl-ethylamine or beta-imidazolyl-ethylamine, with the chemical structure as shown, and considered to be the decarboxylation product of the amino acid histidine, chemically designated as alpha-amino beta-imidazol propionic acid with the chemical structure as follows:

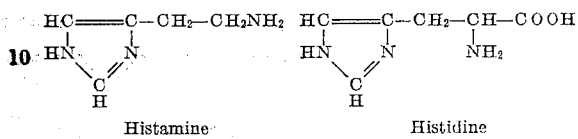

Histamine         Histidine

In order to lessen the effect of histaminase on histamine, and thus allow the latter to exert a greater physiological action in human vascular disease processes through its small vessel dilating action, diamines and related compounds because of their greater affinity for histaminase, have been given orally together with the therapeutic precursors of histamine with successful clinical results, as shown by a vaso-depressor effect on hypertensive individuals, the more rapid healing of ulcers, acute or chronic, with or without associated gangrene and clinical improvement of chronic cardiac patients.

Because of this action of the diamines and related compounds in relation to histaminase, they are hereby designated as histamine accelerators. The four diamines and their hydrochloride salts and tetramine to be designated as such are the first four groups of organic compounds whose chemical formulas are set forth hereinabove, and spermine.

The above described anti-histaminase compounds tend to suppress the action of histaminase on histamine thus permitting the histamine to exert its natural action in the body.

My invention depresses the action of histaminase on histamine in the body thus resulting in the utilization of more available histamine.

The combination of said precursors of histamine with any of the above anti-histaminase compounds forms a product which can be administered orally and which produces the above new and beneficial results.

Under the above therapeutic precursors of histamine are included such combinations as histidine and ascorbic acid; histidine and cysteine; and histidine and pyridoxine.

Dosages of the various ingredients of my invention may vary according to the individual and according to the stage or severity of his disorder.

Accordingly, the preferred ranges of my ingredients are as follows:

Ingredients:
| | |
|---|---|
| Histidine _____milligrams__ | 200 to 600 |
| Pyridoxine _____do____ | 5 to 50 |
| Cysteine _____do____ | 100 to 400 |
| Ascorbic acid _____do____ | 100 to 400 |
| Ethylenediamine _____grams__ | 0.2 to 1.5 |
| Crystalline hydrochloride salts of ethylenediamine _____grams__ | 0.2 to 1.5 |
| Tetramethylenediamine milligrams__ | 0.2 to 1.5 |
| Crystalline hydrochloride salts of tetramethylenediamine milligrams__ | 25 to 300 |

The foregoing include all of the ingredients that I have tested. Other ingredients mentioned in my specification, such as trimethylenediamine and pentamethylenediamine have not been tested because of difficulty or inaccessibility of acquiring them and making the tests but presumably their ranges would be proportionate to the ranges of the other diamines.

The antihistaminase compounds can be conveniently administered in drops placed in water that is consumed substantially contemporaneously with the powdered or tablet dosages of the various precursors of histamine in vivo, although it is not necessary to administer them in this way. All of the ingredients of each combination can be combined into a single mixture or powder or they can be incorporated with a suitable binding agent in a single tablet or pill for convenience of manufacture and marketing.

A suitable binding agent is starch or starch in combination with sugar or dextrose. These binding agents are combined with the other ingredients using magnesium stearate, calcium stearate or talc as a lubricant. After the suitable binding agent has been combined with the other elements the resultant composition of matter using the magnesium stearate, calcium stearate or talc as a lubricant is in a suitable condition to be compressed into either a tablet or a pill for convenience in administration.

Also it is somewhat painful to the patient to administer injections of the ingredients and the powdered or tablet or pill form has a great advantage therefore in this regard. Test tube tests of the various diamines would avail nothing practical because they would not represent the conditions in the body if the same ingredients were administered. This is because the various foods that are ordinarily eaten quite often contain percentages of inhibitors which destroy the relative proportions of any combination that might be tested in a test tube. For this reason I have found it is preferable to determine the ranges of each ingredient and compound the dosages from the ingredients within those ranges.

A list of the preferred average dosages of the various combinations of ingredients might be made though I do not wish to be limited to this list but only to the ranges set forth hereinabove. Such a preferred combination table would be as follows:

PYRIDOXINE COMPOSITIONS

*Ethylenediamine*

| | | |
|---|---|---|
| Histidine | milligrams | 400 |
| Pyridoxine | do | 25 |
| Ethylenediamine | gram | 0.5 |

*Crystalline hydrochloride salts of ethylenediamine*

| | | |
|---|---|---|
| Histidine | milligrams | 400 |
| Pyridoxine | do | 25 |
| Crystalline hydrochloride salts of ethylenediamine | gram | 0.5 |

*Tetramethylenediamine*

| | Milligrams |
|---|---|
| Histidine | 400 |
| Pyridoxine | 25 |
| Tetramethylenediamine | 100 |

*Crystalline hydrochloride salts of tetramethylenediamine*

| | Milligrams |
|---|---|
| Histidine | 400 |
| Pyridoxine | 25 |
| Crystalline hydrochloride salts of tetramethylenediamine | 100 |

CYSTEINE COMPOSITIONS

*Ethylenediamine*

| | | |
|---|---|---|
| Histidine | milligrams | 400 |
| Cysteine | do | 200 |
| Ethylenediamine | gram | 0.5 |

*Crystalline hydrochloride salts of ethylenediamine*

| | | |
|---|---|---|
| Histidine | milligrams | 400 |
| Cysteine | do | 200 |
| Crystalline hydrochloride salts of ethylenediamine | gram | 0.5 |

*Tetramethylenediamine*

| | Milligrams |
|---|---|
| Histidine | 400 |
| Cysteine | 200 |
| Tetramethylenediamine | 100 |

*Crystalline hydrochloride salts of tetramethylenediamine*

| | Milligrams |
|---|---|
| Histidine | 400 |
| Cysteine | 200 |
| Crystalline hydrochloride salts of tetramethylenediamine | 100 |

ASCORBIC ACID COMPOSITIONS

*Ethylenediamine*

| | | |
|---|---|---|
| Histidine | milligrams | 400 |
| Ascorbic acid | do | 400 |
| Ethylenediamine | gram | 0.5 |

*Crystalline hydrochloride salts of ethylenediamine*

| | | |
|---|---|---|
| Histidine | milligrams | 400 |
| Ascorbic acid | do | 400 |
| Crystalline hydrochloride salts of ethylenediamine | gram | 0.5 |

*Tetramethylenediamine*

| | Milligrams |
|---|---|
| Histidine | 400 |
| Ascorbic acid | 400 |
| Tetramethylenediamine | 100 |

*Crystalline hydrochloride salts of tetramethylenediamine*

| | Milligrams |
|---|---|
| Histidine | 400 |
| Ascorbic acid | 400 |
| Crystalline hydrochloride salts of tetramethylenediamine | 100 |

While I have described in some detail presently preferred embodiments of my product and presently preferred methods of performing my invention, it is to be understood that various modifications may be made therein within the scope of the subsequently appended claims.

I claim:

1. A composition of matter comprising: a mixture crystalline histidine, crystalline pyridoxine and a sufficient amount of crystalline tetramethylenediamine to substantially inhibit the inactivation of histamine formed by interaction of the histidine and pyridoxine in a liquid medium which contains the enzyme histidine decarboxylase.

2. A composition of matter comprising: a mixture of crystalline histidine, crystalline pyridoxine and a sufficient amount of a crystalline hydrochloride salt of tetramethylenediamine to substantially inhibit the inactivation of histamine formed by interaction of the histidine and pyridoxine in a liquid medium which contains the enzyme histidine decarboxylase.

3. A composition of matter comprising a mixture of crystalline histidine, a crystalline form of at least one heterocyclic polyhydroxy vitamin selected from the group of consisting of pyridoxine and ascorbic acid and a crystalline form of at least one anti-histaminase compound selected from the group consisting of tetramethylenediamine and the hydrochloride salts of tetramethylenediamine.

4. A composition of matter comprising a mixture of crystalline histidine, crystalline ascorbic acid and a sufficient amount of a crystalline form of one of the hydrochloride salts of tetramethylenediamine to substantially inhibit the inactivation of histamine formed by the interaction of said histidine and ascorbic acid in a liquid medium.

RUDOLPH R. WIDMANN.

REFERENCES CITED

The following references are of record in the file of this patent:

UNITED STATES PATENTS

| Number | Name | Date |
|---|---|---|
| 2,134,246 | Elger | Oct. 25, 1938 |

OTHER REFERENCES

Hirschfield: Archives of Otolaryngology, vol. 44 (Dec. 1946), page 686.

U. S. Dispensatory, 23rd ed. (1943), pages 1361, 1532.

Wirtschafter and Widmann: Journal of the American Medical Association, vol. 133, pages 604, 605 (Mar. 1, 1947).

Holz: Naturwissenschaften, vol. 25 (1937), page 14.

Block: Zeitschrift für Physiologische Chemie, vol. 239 (1936), pages 236 to 240.

Journal of the Amer. Med. Assn., vol. 139, Jan. 22, 1949, page 249.